US011634127B2

(12) United States Patent
Hawes et al.

(10) Patent No.: US 11,634,127 B2
(45) Date of Patent: Apr. 25, 2023

(54) NEAR-OBJECT DETECTION USING ULTRASONIC SENSORS

(71) Applicant: Aptiv Technologies Limited, St. Michael (BB)

(72) Inventors: Kevin J. Hawes, Greentown, IN (US); Qian Wang, Westfield, IN (US)

(73) Assignee: Aptiv Technologies Limited, St. Michael (BB)

( * ) Notice: Subject to any disclaimer, the term of this patent is extended or adjusted under 35 U.S.C. 154(b) by 318 days.

(21) Appl. No.: 17/021,808

(22) Filed: Sep. 15, 2020

(65) Prior Publication Data

US 2022/0080960 A1    Mar. 17, 2022

(51) Int. Cl.
*B60W 30/09* (2012.01)
*B60W 30/095* (2012.01)
*G01S 15/08* (2006.01)
*G01S 15/931* (2020.01)

(52) U.S. Cl.
CPC ......... *B60W 30/0956* (2013.01); *G01S 15/08* (2013.01); *G01S 15/931* (2013.01); *B60W 2420/54* (2013.01); *B60W 2520/06* (2013.01); *B60W 2554/80* (2020.02); *G01S 2015/937* (2013.01)

(58) Field of Classification Search
CPC ........ G01S 15/931; G01S 15/08; G01S 15/18; G01S 7/52004; G01S 2015/938; G01S 2015/937; G01S 2015/932; B60W 30/0956; B60W 2520/06; B60W 2554/80; B60W 2420/54
See application file for complete search history.

(56) References Cited

U.S. PATENT DOCUMENTS

| 8,248,887 B2 * | 8/2012 | Akiyama | G01S 7/539 |
| | | | 367/98 |
| 9,903,942 B2 * | 2/2018 | Harada | G01S 15/931 |
| 11,295,547 B2 * | 4/2022 | Biswas | G01S 15/523 |

(Continued)

FOREIGN PATENT DOCUMENTS

| DE | 112020003060 T5 * | 3/2022 | ............. G01S 15/87 |
| EP | 2799905 A1 | 11/2014 | |

(Continued)

OTHER PUBLICATIONS

Wikipedia, Finite-state machine (Year: 2022).*
"Extended European Search Report", EP Application No. 21191235. 7, dated Feb. 9, 2022, 11 pages.

*Primary Examiner* — Daniel L Murphy
*Assistant Examiner* — Amie M Ndure
(74) *Attorney, Agent, or Firm* — Sawtooth Patent Group PLLC

(57) ABSTRACT

This document describes near-object detection using ultrasonic sensors. Specifically, when an object is in a near-object range or distance from a vehicle, an object-detection system of the vehicle can utilize raw range measurements and various parameters derived from the raw range measurements. The various parameters may include an average, a slope, and a variation of the range. In the near-object range, using the parameters derived from the raw range measurements may lead to increases in the accuracy and performance of a vehicle-based object-detection system. The increased accuracy in near-object detection capability enhances safe driving.

20 Claims, 5 Drawing Sheets

(56) References Cited

U.S. PATENT DOCUMENTS

| | | | | |
|---|---|---|---|---|
| 11,360,212 | B2* | 6/2022 | Nomura | G01S 15/93 |
| 2008/0259730 | A1* | 10/2008 | Di Federico | G01J 5/044 |
| | | | | 367/118 |
| 2009/0224959 | A1* | 9/2009 | Matsukawa | G01S 15/931 |
| | | | | 342/73 |
| 2011/0241858 | A1* | 10/2011 | Tsuzuki | G01S 7/54 |
| | | | | 340/435 |
| 2012/0170411 | A1* | 7/2012 | Suzuki | G01S 7/5276 |
| | | | | 367/99 |
| 2015/0323668 | A1* | 11/2015 | Heimberger | G01S 15/66 |
| | | | | 367/99 |
| 2016/0069990 | A1* | 3/2016 | Harada | G01S 15/42 |
| | | | | 367/98 |
| 2016/0116583 | A1* | 4/2016 | Fukuman | G01S 7/527 |
| | | | | 342/59 |
| 2017/0227640 | A1* | 8/2017 | Nomura | G01S 7/524 |
| 2019/0196010 | A1* | 6/2019 | Sugae | G01S 15/104 |
| 2020/0096633 | A1* | 3/2020 | Matsuura | G01S 15/04 |

FOREIGN PATENT DOCUMENTS

| | | | | | |
|---|---|---|---|---|---|
| GB | 2251309 | A | * | 7/1992 | G01S 7/52004 |
| JP | 2019079188 | A | * | 5/2019 | G01B 21/00 |
| KR | 20130046129 | A | * | 10/2011 | B60W 50/14 |
| KR | 102319777 | B1 | * | 9/2018 | G01S 3/8083 |
| RU | 2015110076 | A | * | 10/2016 | G01S 15/42 |
| WO | WO-2020239450 | A1 | * | 12/2020 | G01S 15/04 |

\* cited by examiner

NEAR-OBJECT DETECTION USING ULTRASONIC SENSORS

BACKGROUND

Automotive manufacturers often use ultrasonic sensors for object detection in vehicle-parking-assist functions. One drawback of existing ultrasonic sensors is their ability to detect objects in near-object ranges, for example, objects that are closer than 0.15 meters (0.15 m) from a vehicle. This drawback may be a result of a physical limitation of a transducer of the ultrasonic sensor when transitioning from an active transmitter to a passive receiver. It is desirable to have a technological solution that can accurately detect an object in a near-object range and to alert and/or assist the vehicle and/or a driver of the vehicle from driving into the object.

SUMMARY

This document describes near-object detection using ultrasonic sensors. Specifically, when an object is in a near-object range or distance from a vehicle, an object-detection system of the vehicle can utilize raw range measurements and various parameters derived from the raw range measurements. The various parameters may include an average, a slope, and a variation of the range. In the near-object range, using the parameters derived from the raw range measurements may lead to increases in the accuracy and performance of a vehicle-based object-detection system. The increased accuracy in near-object detection capability enhances safe driving.

In one aspect, a system is configured to monitor parameters for near-object detection using at least one ultrasonic sensor, where the parameters includes an average of a range of an object from at least one ultrasonic sensor, a slope of the range, and a variation or variance of the range. The system determines whether the range satisfies a range threshold. In response to determining that the range does satisfy the range threshold, the system detects the object by operating the at least one ultrasonic sensor in a near-object state. In response to determining that the range does not satisfy the range threshold, the system detects the object by operating the at least one ultrasonic sensor in a non-near-object state.

In another aspect, a computer-implemented method comprises monitoring parameters for near-object detection using at least one ultrasonic sensor, where the parameters include an average of a range of an object from at least one ultrasonic sensor, a slope of the range, and a variation of the range. Then, the method determines whether the range satisfies a range threshold. If the range does satisfy the range threshold, the method detects the object by operating the at least one ultrasonic sensor in a near-object state. If, however, the range does not satisfy the range threshold, the method detects the object by operating the at least one ultrasonic sensor in a non-near-object state in response.

This summary is provided to introduce simplified concepts for near-object detection using ultrasonic sensors, which are further described below in the Detailed Description and Drawings. Note that throughout the disclosure terms "ultrasonic sensor," "transducer," "transmitter," and "receiver" may be used interchangeably, depending on the context of the description, linguistic choice, and other factors. Also, for ease of description and sake of clarity, the disclosure focuses on automotive ultrasonic systems; however, the techniques are not limited to automobiles. The techniques may also apply to ultrasonic sensors of other types of vehicles, systems, and/or moving platforms. Additionally and/or alternatively, the techniques described herein may apply to other types of sensors, for example, radar, lidar, infrared sensors, and so forth. This summary is not intended to identify essential features of the claimed subject matter, nor is it intended for use in determining the scope of the claimed subject matter.

BRIEF DESCRIPTION OF THE DRAWINGS

The details of one or more aspects of near-object detection using ultrasonic sensors used for vehicle-parking-assist functions are described in this disclosure with reference to the following drawings. The same numbers are used throughout the drawings to reference like features and components:

FIG. 2-1 illustrates an example implementation of the vehicle of FIG. 1 in more detail.

FIG. 2-2 illustrates an example implementation of an object-proximity module, which is used to determine whether an object-detection system operates in a near-object state or a non-near-object state.

DETAILED DESCRIPTION

Overview

Figure 1:
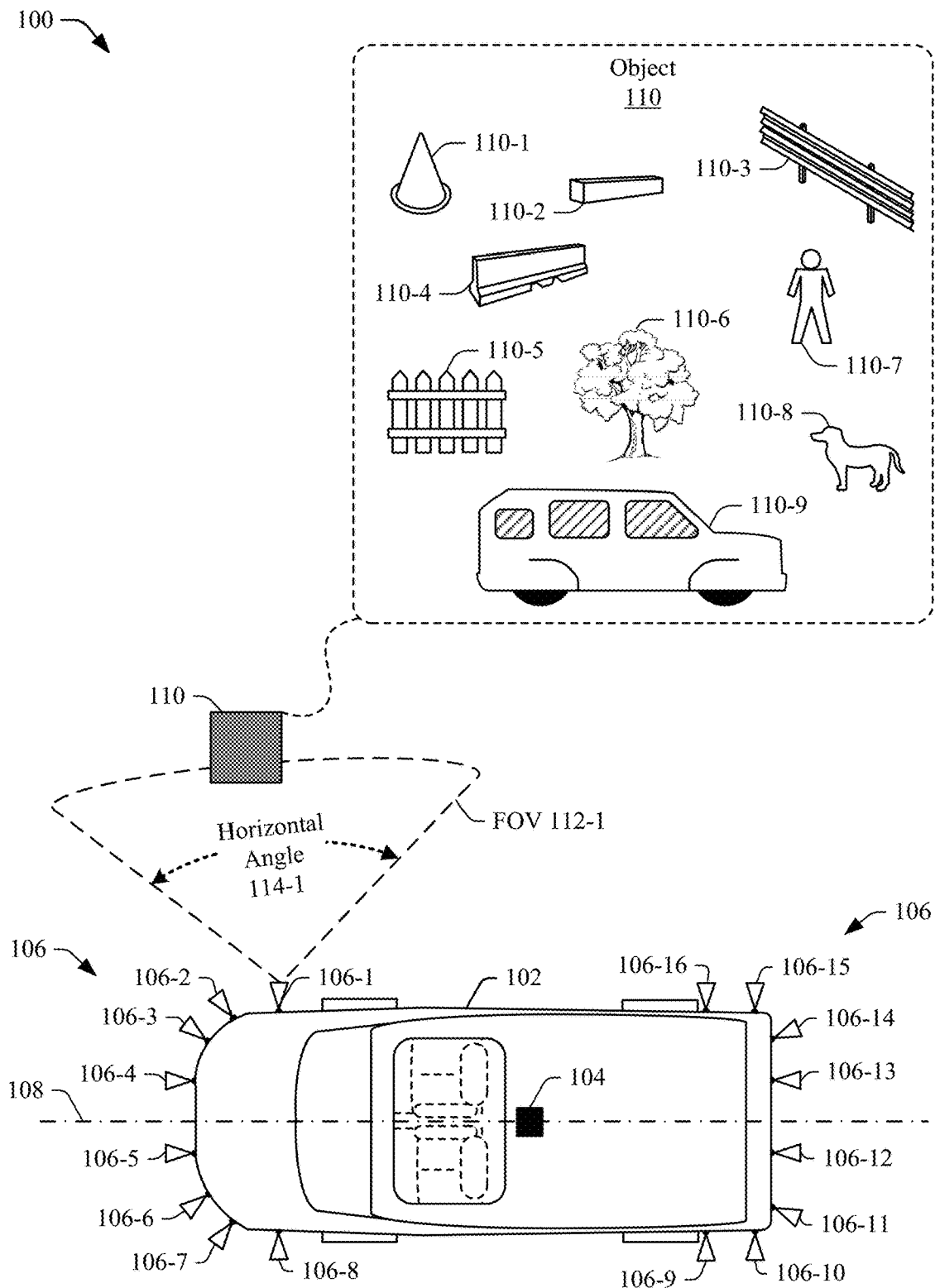
FIG. 1 illustrates an example environment in which one or more aspects of an example near-object-detection system using ultrasonic sensors embedded in or on a vehicle can be implemented.

Automotive manufacturers often use ultrasonic sensors for object detection in vehicle-parking-assist functions. One drawback of existing ultrasonic sensors is their inability to reliably detect objects in near-object ranges, for example, objects that are closer than 0.15 meters (0.15 m) from a vehicle. This drawback may be a result of a physical limitation of a transducer of the ultrasonic sensor when transitioning from an active transmitter to a passive receiver. Note that an active transmitter may be a powered oscillating speaker, while a passive receiver may be a microphone.

The transition time of the ultrasonic transducer from the active transmitter to the passive receiver is approximately one millisecond (1 ms). Specifically, the 1-ms time or period is the time it takes the ultrasonic sensor to dampen out a ringdown of the ultrasonic sensor. As such, an automotive manufacturer may configure the ultrasonic sensor to ignore ultrasonic signals received by the receiver of the transducer during the 1 ms ringdown period. Also, when detecting an object in a near object range, a transmitted sound level is sufficiently strong to produce multiple sound echoes between the object and the ultrasonic sensor of the vehicle. These multiple echoes may give false range or distance values when the object is within 0.15 m or less from the ultrasonic sensor. For example, a stationary pole 0.1 m from the ultrasonic sensor of the vehicle may appear farther than the actual range of the stationary pole to the vehicle. Similarly, a pedestrian leaning against the vehicle may falsely indicate a longer range. Therefore, it is desirable to have a technological solution that can accurately detect an object in a near-object range and to alert and/or assist the vehicle and/or a driver of the vehicle from driving into the object.

This document describes apparatuses, methods, and techniques for near-object detection using ultrasonic sensors used in vehicle-parking-assist functions. Unlike existing ultrasonic-sensor solutions that fail to accurately detect an object in a near-object range, the document describes a technological solution that can accurately detect an object in a near-object range, which can aid a vehicle and/or a driver of the vehicle to operate the vehicle and refrain from driving into the object. It is to be appreciated that this document describes how to achieve near-object detection by using ultrasonic sensors of a same or equivalent version, where the version depends on a technology, a model, a make, cost, or a combination thereof, of existing ultrasonic-sensor solutions. It is to be understood that using higher-end ultrasonic sensors can improve the described near-object detection even further.

It is advantageous to use more than raw range measurements and/or observations to achieve accurate near-object detection. Hence, the near-object detection described herein uses parameters that are derived from the raw range measurements, and the use of the parameters enable near-range detection. The parameters may include an average, a slope, and a variation of the range, as is described in more detail below.

Example Environment

FIG. 1 illustrates an example environment 100 in which one or more aspects of near-object detection using ultrasonic sensors embedded in and/or on a vehicle 102, for example when being used for vehicle-parking-assist functions, can be implemented. In the illustrated example, the vehicle 102 includes an object-detection system 104. The object-detection system 104 is communicatively coupled to an ultrasonic-sensor layout 106, which in the example of FIG. 1, shows as being near or at the borders of the vehicle 102. As is illustrated in FIG. 1, the ultrasonic-sensor layout 106 includes sixteen (16) ultrasonic sensors 106-1 to 106-16. Nevertheless, the ultrasonic-sensor layout 106 may include more or less than sixteen (16) ultrasonic sensors. Also, the ultrasonic-sensor layout 106 may differ from the illustration in FIG. 1 including being away from the borders of the vehicle 102 in cases where improved object detection can be achieved. For example, relative to the size and shape of the vehicle 102, spaces between neighboring ultrasonic sensors may have a same horizontal distance, different horizontal distances, and/or the ultrasonic-sensor layout 106 may have any spatial arrangement that an automotive manufacturer may deem suitable for near-object detection.

The automotive manufacturer may embed the ultrasonic sensors 106-1 to 106-16 in and/or on each lateral side of the vehicle 102, proximate to each corner of the vehicle 102, across the front of the vehicle 102, and/or across the rear of the vehicle 102 (e.g., on bumpers of the vehicle 102). As described herein, a lateral side is a side running largely parallel to a longitudinal axis 108 of the vehicle 102. Each ultrasonic sensor 106-1 to 106-16 has a field of view (FOV) that encompasses a region of interest in which an object 110 can be detected.

For ease of description and sake of clarity, a FOV 112-1 illustrates the FOV of the ultrasonic sensor 106-1. It is to be understood that each ultrasonic sensor 106-1 to 106-16 has a similar FOV, but not necessarily a FOV of the same dimensions. The dimensions of the FOV 112-1 depend partly on the design, make, model, and/or technology of the ultrasonic sensor 106-1. For example, the FOV 112-1 may have a horizontal (azimuth) angle 114-1, which may be 120 degrees (120°) and an elevation angle, which may be 60° and for clarity in the drawings, is not illustrated in FIG. 1.

The horizontal angle 114-1 of the FOV 112-1 may extend 60° to the right and 60° to the left of the center of the ultrasonic sensor 106-1. Also, the elevation angle may extend 30° up and 30° down from the center of the ultrasonic sensor 106-1, where up and down denote elevations in respect to ground or any platform.

Although not illustrated in FIG. 1, the FOVs of adjacent ultrasonic sensors 106-1 to 106-16 in the ultrasonic-sensor layout 106 may overlap. For example, the FOV of the ultrasonic sensor 106-2 may overlap with the FOV 112-1 of the ultrasonic sensor 106-1 and the FOV of the ultrasonic sensor 106-3. Alternatively and/or additionally, the FOVs of each ultrasonic sensor 106-1 to 106-16 may overlap with more than the FOVs of the immediate adjacent ultrasonic sensors, for example, with the FOVs of two neighboring ultrasonic sensors to the right and two neighboring ultrasonic sensors to the left.

The object 110 can be a stationary or a non-stationary object. As described herein, the object 110 comprises one or more materials that reflect ultrasonic waves or signals. As such, the object can be a living organism or a non-living entity. Also, depending on the application, the object 110 can represent a target of interest or a clutter of objects. The object 110 can be any object within the FOV of one or more ultrasonic sensors in the ultrasonic-sensor layout 106. Some example objects include a traffic cone 110-1 or other small object, a curb 110-2, a guard rail 110-3, a barrier 110-4, a fence 110-5, a tree 110-6, a person 110-7, an animal 110-8 (e.g., dog, cat), another vehicle 110-9, and/or other stationary or non-stationary objects.

Figures 1, 2:
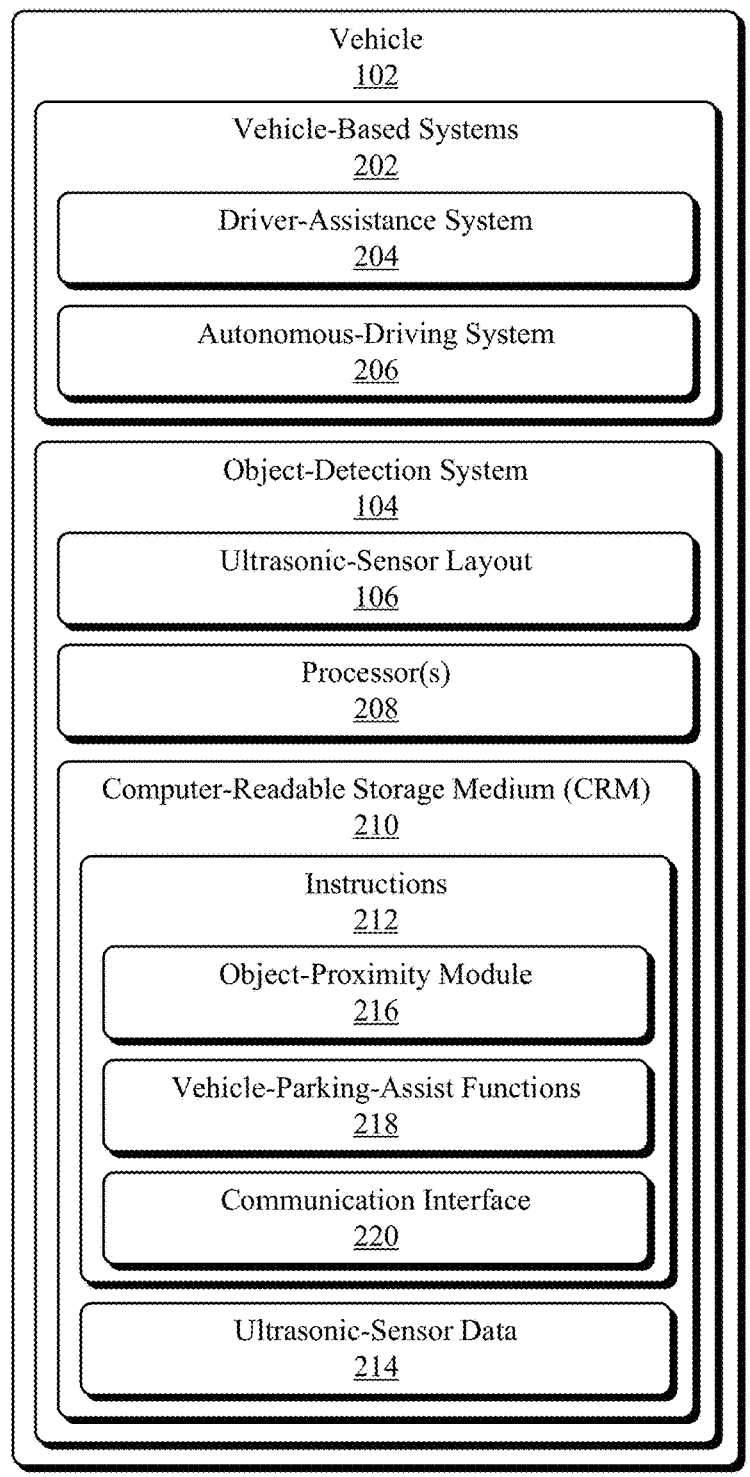
Figure 2:
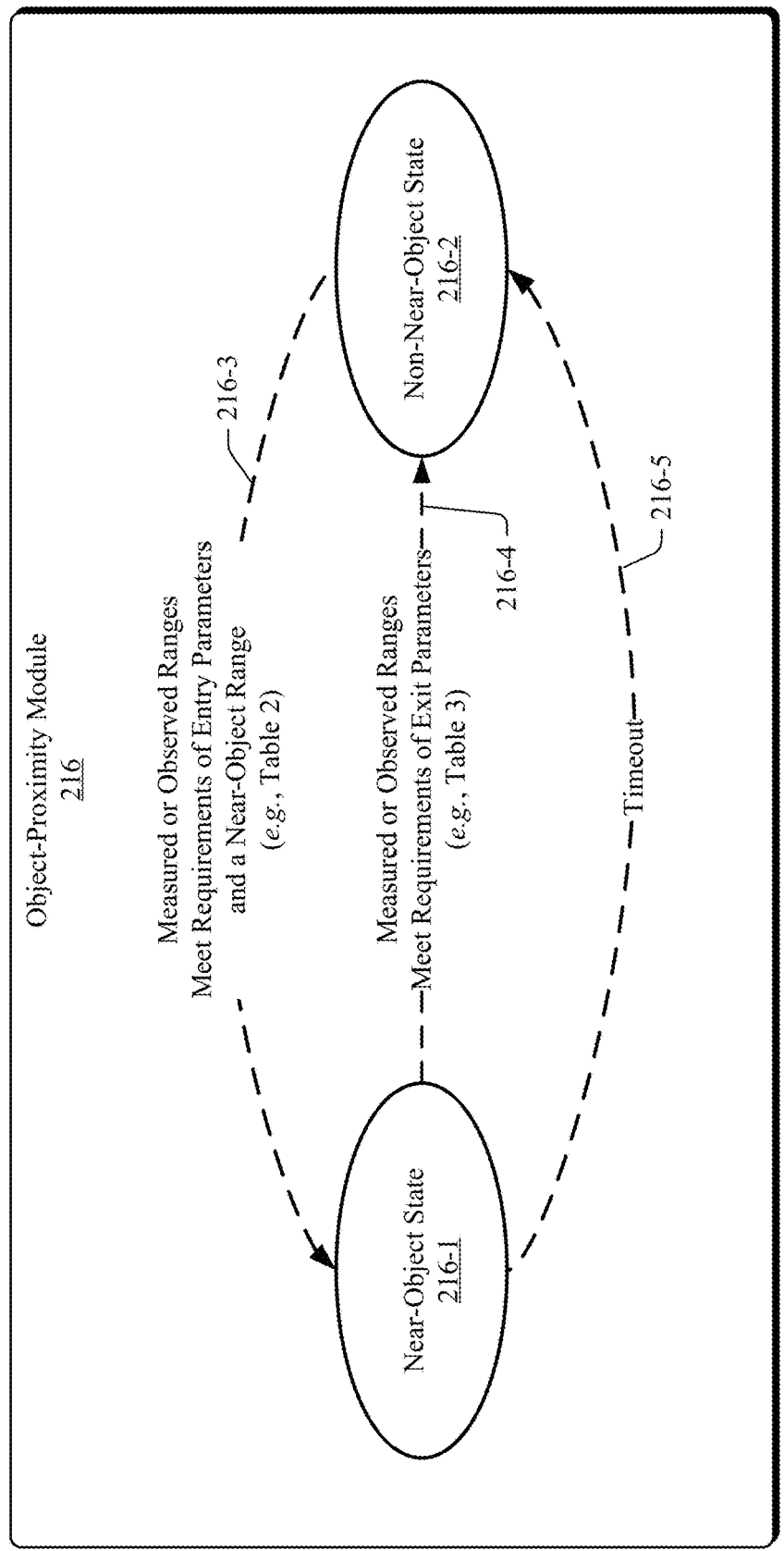

FIG. 2-1 illustrates an example implementation 200-1 of the vehicle 102 in more detail. The vehicle 102 includes vehicle-based systems 202, for example, a driver-assistance system 204 (e.g., a parking assist function) and/or an autonomous-driving system 206. The vehicle-based systems 202, among other technologies, like a Global Navigation Satellite System (GNSS) (e.g., Galileo, Global Positioning System (GPS), Quasi-Zenith Satellite System (QZSS), BeiDou, GLObal NAvigation Satellite System (GLONASS), and for forth), may also rely on the object-detection system 104.

The object-detection system 104 includes the ultrasonic-sensor layout 106, which consists of the ultrasonic sensors 106-1 to 106-16. The object-detection system 106 includes processor(s) 208 and a computer-readable storage medium (CRM) 210. The processor 208 can be implemented using any type of processor, for example, a central processing unit (CPU), a microprocessor, a multi-core processors, and so forth, and is configured to execute instructions 212 (e.g., code, MATLAB® script) stored in the CRM 210. The CRM 210 may include various data-storage media, for example, volatile memory, non-volatile memory, optical media, magnetic media, and so forth. The CRM 210 may also store ultrasonic-sensor data 214, which are obtained using the ultrasonic-sensor layout 106.

The object-detection system 104 uses an object-proximity module 216 stored on the CRM 210. The object-proximity module 216, when executed by the processors 208, causes the processors 208 to use the ultrasonic-sensor data 214 to determine whether the object-detection system 104 operates in a near-object state or a non-near-object state, as it is further described in FIG. 2-2. For example, the object-proximity module 216 utilizes the processor 208 to calculate various parameters using the ultrasonic-sensor data 214 and executing the instructions 212 that are stored in the CRM 210. The object-detection system 104 may utilize the object-proximity module 216 for vehicle-parking-assist functions 218 stored on the CRM 210 and executable by the processors 208. The object-detection system 104 also includes a communication interface 220 stored on the CRM 210 and when executed by the processors 208, configures the processors 208 to transmit the ultrasonic-sensor data 214 and/or the vehicle-parking-assist functions 218 to the vehicle-based-systems 202, an operator or driver of the vehicle 102, and/or other components, systems, and functions of the vehicle 102.

Determining a Near-Object Range or a Non-Near-Object Range

FIG. 2-2 illustrates an example implementation 200-2 of the object-proximity module 216, which is used to determine whether the object-detection system 104 operates in a near-object state 216-1 or a non-near-object state 216-2. The object-detection system 104 operates in the near-object state 216-1 when the object-proximity module 216 determines the object 110 is in a near-object range (e.g., distance) relative to the vehicle 102. Alternatively, the object-detection system 104 operates in the non-near-object state 216-2 when the object-proximity module 216 determines that the object 110 is in a non-near-object range relative to the vehicle 102.

One drawback of existing ultrasonic sensors is their inability to detect and precisely measure the range of the object 110 in the near-object range. Equation 1 offers a "back-of-the-envelope" calculation of a time t it takes the transducer to transmit and receive an ultrasonic wave or a sound signal:

$$t = \frac{(l_{transmit} + l_{receive})}{c} \quad \text{Equation 1}$$

where $l_{transmit}$ denotes a range of an outbound-ultrasonic wave, $l_{receive}$ denotes a range of a return-ultrasonic wave, and c denotes a speed of the ultrasonic wave as the ultrasonic wave propagates through a medium (e.g., air). For example, assuming the object 110 is 0.15 meters (0.15 m) away from the vehicle 102 and considering the speed of sound propagating (traveling) through air is approximately 331 meters per second (331 m/s), Equation 2 suggests a time $t_{0.15\ m\ range}$ of approximately one millisecond (1 ms).

$$t_{0.15\ m\ range} = \frac{(0.15\ m + 0.15\ m)}{331 \frac{m}{s}} \approx 1\ \text{ms} \quad \text{Equation 2}$$

As another example, assuming the object 110 is 2.5 m away from the vehicle 102, Equation 3 suggests a time $t_{2.5\ m\ range}$ of approximately 15 ms.

$$t_{2.5\ m\ range} = \frac{(2.5\ m + 2.5\ m)}{331 \frac{m}{s}} \approx 15\ \text{ms} \quad \text{Equation 3}$$

Equation 2 illustrates one reason why an existing ultrasonic sensor cannot detect and precisely measure the range of the object 110 in the near-object range because the "ringdown period" of the transducer is also approximately 1 ms. As such, the automotive manufacturer may configure the ultrasonic sensor to ignore signals received by the receiver of the transducer during the 1-ms ringdown period. In practice, however, it may take 15 ms to operate or scan an ultrasonic sensor to detect an object. Therefore, Equation 3 helps illustrate that some current ultrasonic-sensor solutions can detect the object 110 as far as 2.5 m away from an ultrasonic sensor. Assume the object 110 is located approximately one meter (1 m) away from the ultrasonic sensor, the ultrasonic sensor may be idle for a period that is less than the 15-ms time-interval (e.g., 6 ms of idle time after the ultrasonic sensor detects the object 110).

Further, automotive manufacturers often embed the same type of ultrasonic sensor in the ultrasonic-sensor layout 106. Thus, each ultrasonic sensor 106-1 to 106-16 operates in a same frequency (e.g., 48 kilohertz (kHz) or 52 kHz). Operating multiple ultrasonic sensors in the same frequency is one reason the automotive manufacturer may configure the ultrasonic sensors to operate at different times (e.g., consecutively from 106-1 to 106-16). Without ultrasonic-wave processing, operating the ultrasonic sensors at approximately a same time or concurrently may cause a receiver of a first ultrasonic sensor (e.g., 106-1) to receive a transmitted ultrasonic wave from a transmitter of a second ultrasonic sensor (e.g., 106-2). In that case, the first ultrasonic sensor (e.g., 106-1) cannot distinguish an ultrasonic wave that is reflected of an object (e.g., 110) from an ultrasonic wave that is transmitted from the second ultrasonic sensor (e.g., 106-2). As illustrated in FIG. 1, the ultrasonic-sensor layout 106 includes sixteen (16) ultrasonic sensors 106-1 to 106-16. Thus, existing ultrasonic-sensor solutions may take as long as 0.25 s to operate or to scan each of the sixteen ultrasonic sensors at separate times or consecutively at 15-ms time-intervals. As such, existing ultrasonic-sensor solutions may not successfully detect an object 110 (e.g., a toddler 110-7 running) located 2.5 m away during a 0.25 s time-period.

In one aspect, to shorten the time it takes to scan each of the ultrasonic sensors in the ultrasonic-sensor layout 106, the automotive manufacturer may use fewer than all (e.g., sixteen (16)) of the ultrasonic sensors. For example, the automotive manufacturer may arrange some of the ultrasonic sensors differently than others. Embedding eight (8) of the total sixteen (16) ultrasonic sensors in such a way that the vehicle 102 can still detect objects from each side, the rear, and/or the front of the vehicle 102. There may be some trade-off, however, using fewer ultrasonic sensors in the ultrasonic-sensor layout 106. That is, by indiscriminately turning off or altogether removing some ultrasonic sensors of the ultrasonic-sensor layout 106 may result in "blind spots," and the object-detection system 104 may fail to detect the object 110.

Therefore, the automotive manufacturer may configure the object-proximity module 216 to operate or scan a select portion of the ultrasonic-sensor layout 106 during certain vehicle operations. For example, assume the vehicle 102 starts driving in reverse, the object-proximity module 216 can operate or scan only the ultrasonic sensors embedded in or on the rear of the vehicle 102 (e.g., 106-11 to 106-14), reducing the total scan time of the ultrasonic-sensor layout 106. Alternatively and/or additionally, the automotive manufacturer may configure the object-proximity module 216 to concurrently operate the ultrasonic sensors of the ultrasonic-sensor layout 106 by modulating (e.g., amplitude modulation) or by transmitting different patterns of ultrasonic waves using each of the ultrasonic sensors of the ultrasonic-sensor layout 106.

As described herein, a near-object range can be considered on the order of a range of less than 0.15 m, and a non-near-object range is anything greater, for example, a range on the order of more than 0.15 m. It is to be understood that the near-object range can vary depending on the version of the ultrasonic sensor (e.g., the technology, the model, the make, the cost). Thus, the near-object range can vary from 0.15 m to 0.5 m. Equations 1 to 3 and the possibility of multiple echoes between an ultrasonic sensor and an object in a near-object range help explain why existing ultrasonic-sensor solutions may give false range values. This description, however, uses parameters that describe aspects of the range in addition to the range itself. For example, the parameters may specify an average of the range, a slope of the range (speed and/or velocity), and a variation of the range. By using the parameters, the object-proximity module 216 can determine whether the object 110 is in the near-object range or in the non-near-object range.

To determine the average of the range, the object-proximity module 216 may sum the observed and/or measured ranges and divide the sum by a sample size of range observations and/or measurements, as is illustrated in Equation 4:

$$l_{average} = \frac{1}{n} \cdot \sum_{i=1}^{n} l_i \quad \text{Equation 4}$$

where $l_{average}$ denotes the average of the ranges, n denotes the sample size of the range observations and/or measurements, and $l_i$ denotes a value of each range observation and/or measurement.

To determine the slope of the range (e.g., speed, velocity), as in a case of a non-stationary object 110 (e.g., a person 110-7, an animal 110-8, another vehicle 110-9), the object-proximity module 216 may use Equation 5 and/or a derivative thereof:

$$v = \frac{(l_{i+1} - l_i)}{(t_{i+1} - t_i)} \quad \text{Equation 5}$$

where the $l_i$ in Equation 5 denotes an observed and/or measured range at a first time $t_i$, $l_{i+1}$ in Equation 5 denotes an observed and/or measured range at a second time $t_{i+1}$, and v denotes the speed and/or velocity of the non-stationary object 110. Hence, the object-proximity module 216 can determine the slope (speed) and the direction of the slope (velocity). As such, the object-proximity module 216 can determine whether the non-stationary object 110 is approaching the vehicle 102 or departing from the vehicle 102, and how fast is the non-stationary object 110 approaching the vehicle 102 or departing from the vehicle 102.

To determine the variation of the range, the object-proximity module 216 may calculate the variance of a set or sample of observed and/or ranges by using Equation 6, Equation 7, and/or a derivative thereof, for example, Equation 8:

$$s^2 = \frac{1}{n-1} \cdot \sum_{i=1}^{n} (l_i - l_{average}) \quad \text{Equation 6}$$

where $s^2$ denotes the variance of a sample size n (e.g., a sample size n of 20-50);

$$\sigma^2 = \frac{1}{N} \cdot \sum_{i=1}^{N} (l_i - \mu) \quad \text{Equation 7}$$

where $\sigma^2$ denotes the variance of an entire sample population N (e.g., the entire sample population N is more than 50), and $\mu$ denotes the mean range of the entire sample population N; and/or $$l_{variation} = \frac{l_{minimum} - l_{maximum}}{1.696} \quad \text{Equation 8}$$

where $l_{variation}$ denotes the variation of sample size, $l_{minimum}$ denotes a minimum observed range, and $l_{maximum}$ denotes a maximum observed range of the sample size.

In one aspect, the object-proximity module 216 may utilize Equation 8 when calculating the variation of the range of a relatively small sample size. Equation 8 may also be modified by dividing a range difference between the minimum observed range $l_{minimum}$ and the maximum observed range $l_{maximum}$ by a constant different than 1.696. For example, the constant may be anywhere from 1.500 to 2.000. The object-proximity module 216 may utilize Equation 8 to calculate the variation of the ranges of a last-three measured or observed samples n, n-1, and n-2. Note that n denotes a current-range measurement, n-1 denotes the first-prior-range measurement, and n-2 denotes the second-prior-range or the two-prior-range measurement. Hence, Equation 8 may provide a close-to-real-time variation of the range and enables the object-proximity module 216 to reduce the computational time and power needed for such calculations.

The close-to-real-time variation of the range can especially be useful when the object 110 is a non-stationary object, for example, a person 110-7 walking towards the vehicle 102. Also, calculating the variation of the range using Equation 8 can also determine an integrity of the measured or observed ranges n, n-1, and n-2. For example, the person 110-7 often approaches the vehicle 102 with relatively constant velocity (speed and direction) and rarely in a jerking (e.g., back and forth or side to side) motion. Hence, calculating the variation of the range using Equation 8 reflects the movement of the person 110-7 approaching the vehicle 102.

Additionally, the object-proximity module 216 may also utilize driving data, like, the speed and the direction of the vehicle 102, while the vehicle 102 is in motion. As such, the object-proximity module 216 can also determine the average range, the variation of the range, and the speed or velocity of the vehicle 102 approaching towards or departing from a stationary object 110 (e.g., a barrier 110-4) or a non-stationary object 110 (e.g., an animal 110-8), while the vehicle 102 is in motion.

FIG. 2-2 describes the object 110 in motion. It is to be understood, however, that the ultrasonic-sensor layout 106 can detect a stationary object in the near-object state 216-1 when the vehicle 102 is in motion. For example, assume the vehicle 102 is parked near a barrier 110-4 that is located 0.2 m away from the vehicle 102. When the vehicle 102 starts driving or moving towards the barrier 110-4, the object proximity module 216 detects measured or observed ranges that meet requirements of entry parameters 216-3 to operate in the near-object state 216-1. Similarly, when the vehicle 102 starts driving or moving away from the barrier 110-4, the object proximity module 216 detects measured or observed ranges that meet requirements of exit parameters 216-4 to operate in the non-near-object state 216-2. If the object-proximity module 216 cannot determine a near-object state 216-1 within a pre-set amount of time, for example, after five seconds (5 s), the object-proximity module 216-1 may trigger a timeout 216-5. The timeout 216-5 may also serve as a fault recovery for the object-proximity module 216.

FIG. 2-2 illustrates two states: the near-object state 216-1 and the non-near-object state 216-2. Nevertheless, as the object 110 approaches towards to and then moves away from the ultrasonic-sensor layout 106, the object-proximity module 216 can classify that event in five stages: a no-object stage, an entry-object stage, a near-object stage, an exit-object stage, and a no-object stage.

Table 1 illustrates 21 parameters with parameter designators P1 to P21, example parameter names, and example values for the parameters P1 to P21.

TABLE 1

Example Parameters and Values

| Parameter Designator | Parameter Name | Example Value |
|---|---|---|
| P1 | Threshold Average 1 | 0.3000 |
| P2 | Threshold Average 2 Delta | −0.0500 |
| P3 | Threshold Slope 1 | 0.0250 |
| P4 | Threshold Slope 2 | −0.1200 |
| P5 | Threshold Slope 3 | −0.0400 |
| P6 | Threshold Variation 1 | 0.0000 |
| P7 | Threshold Variation 2 | −0.2000 |
| P8 | Threshold Variation 3 | −0.0500 |
| P9 | Threshold Average 3 Entry | −0.0100 |
| P10 | Threshold Average Exit 1 | 0.3500 |
| P11 | Threshold Average Exit 2 | −0.0800 |
| P12 | Threshold Average Exit 3 | −0.0100 |
| P13 | Threshold Slope Exit 1 | −0.0080 |
| P14 | Threshold Slope Exit 2 | 0.0078 |
| P15 | Threshold Slope Exit 3 | 0.0030 |
| P16 | Threshold Variation Exit 1 | −0.2700 |
| P17 | Threshold Variation Exit 2 | −0.2270 |
| P18 | Threshold Variation Exit 3 | −0.2800 |
| P19 | Threshold Slope 4 | −0.0120 |
| P20 | Threshold Slope Exit 4 | −0.0300 |
| P21 | Threshold Average Exit 4 | 0.0500 |

It is to be understood that the automotive manufacturer may use more or fewer than the 21 parameters shown in Table 1 and that the example values in Table 1 may change depending on the implementations of this disclosure. Additionally and/or alternatively, the object-proximity module 216 may consider the example parameter values as hard limits or optional limits (e.g., suggesting, correlating, supporting, secondary, tertiary limits). Further, the object-proximity module 216 may ignore some of the parameters in certain operating states.

The object-proximity module 216 may derive the parameter requirements from the last-three range measurements, which include the average of the range of n, n-1, and n-2, the slope of the range of n, n-1, and n-2, and the variation of the range of n, n-1, and n-2, as is illustrated in Table 2 below. Also, the object-proximity module 216 may derive the parameter requirements from a last-four range measurements, which include the average of the range of n, n-1, n-2, and n-3, the slope of the range n, n-1, n-2, and n-3, and the variation of the range n, n-1, n-2, and n-3, as is illustrated in Table 3 below.

Tables 2 and 3 illustrate how the object-proximity module 216 may utilize the parameters P1 to P21 in respect to FIG. 2-2. Table 2 illustrates brief descriptions of conditions or requirements for select parameter (e.g., P1-P2, P9, P3-P5, P19, P6-P8) that may need to be met for the object-proximity module 216 to determine whether the object 110 is approaching the vehicle 102 in the near-object state 216-1.

TABLE 2

Entry Parameters and Conditions Using the Last-Three Ranges n, n-1, and n-2

| Parameter Designator | Condition |
|---|---|
| P1 | An average of a range is below this parameter value. |
| P2 | The average of the range is higher than a previous range by this parameter value. |
| P9 | An average of a last-three ranges is equal to this parameter value and indicating a slow object-entry state. |
| P3 | A minimum negative slope of a range n-2 and a range n-1 equals this parameter value. |
| P4 | A maximum negative slope of the range n-2 and the range n-1 equals this parameter value. |
| P5 | A positive slope of the range equaling this parameter value indicates a near-object state. |
| P19 | A minimum slope at a range n by this parameter value limits a false-entry determination during an object-leaving state. |
| P6 | Minimum negative slope equals this parameter value. |
| P7 | Maximum negative slope equals this parameter value. |
| P8 | Negative variation trend threshold by this parameter value indicates a near-object state. |

Table 3 illustrates other brief descriptions of conditions or requirements for other select parameter (e.g., P10-P12, P21, P20, P13-P18) that may need to be met for the object-proximity module 216 to determine whether the object 110 is leaving the vehicle 102 from the near-object state 216-1.

TABLE 3

Exit Parameters and Conditions Using a Last-Four Ranges n, n-1, n-2, and n-3

| Parameter Designator | Condition |
|---|---|
| P10 | An average of the range n-2 is below this parameter value. |
| P11 | An average of the range n-1 is greater the average of the range n-2 by this parameter value. |
| P12 | An average of the range n is greater than the average of the range n-1 by this parameter value. |
| P21 | The average of the range n-2 is greater than this parameter value. |
| P20 | A slope of a range n-3 is greater than this parameter value. |
| P13 | A slope of the range n-2 is greater than this parameter value. |
| P14 | A slope of the range n-1 is greater than this parameter value. |
| P15 | A slope of the range n is greater than this parameter value. |
| P16 | A variation of the range n-2 is greater than this parameter value. |
| P17 | A variation of the range n-1 is greater than this parameter value. |
| P18 | A variation of the range n is greater than this parameter value. |

Parameter Optimization

Figure 3:
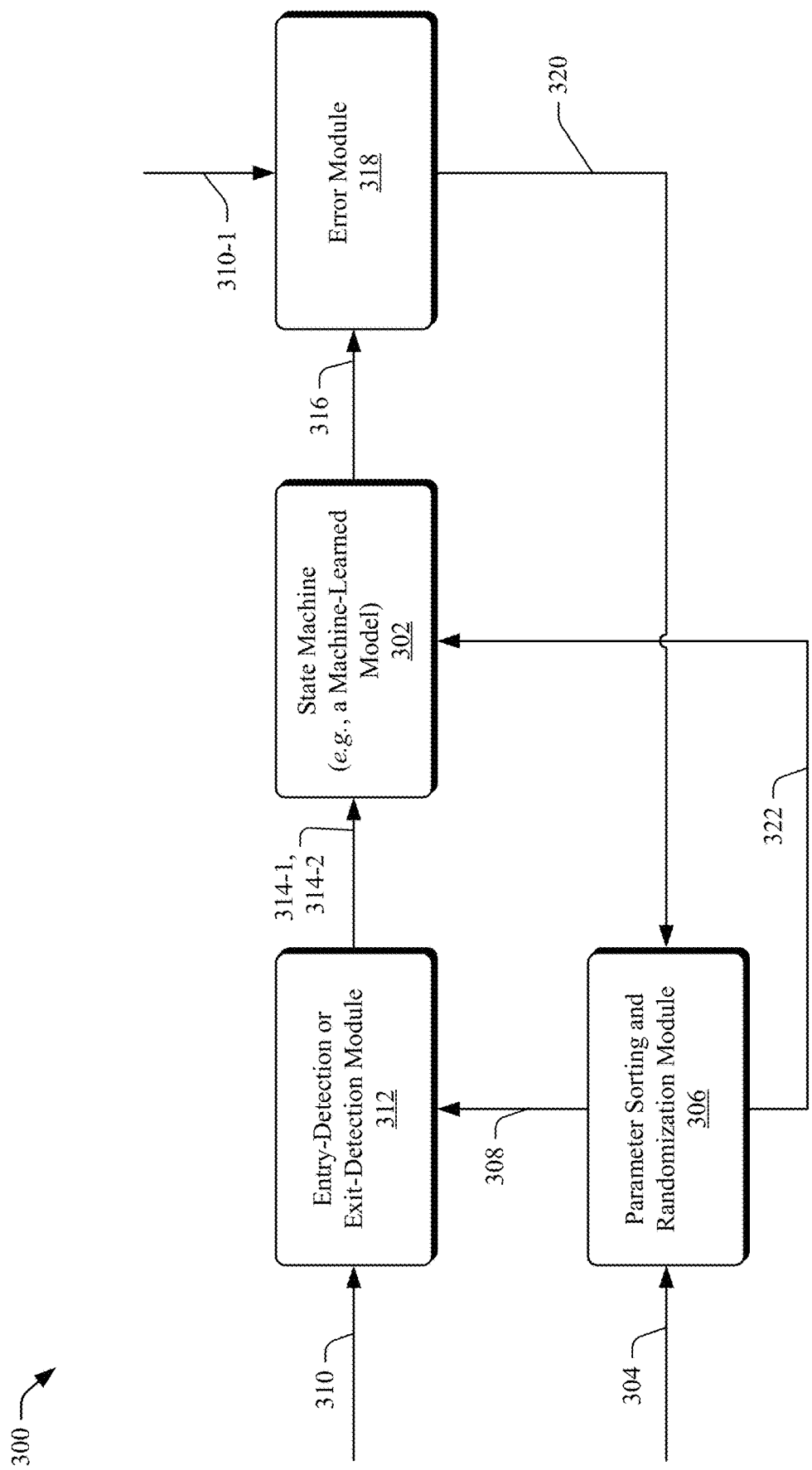
FIG. 3 illustrates an example environment that utilizes a state machine to determine parameters to be used by the object-proximity module of FIG. 2-2.

FIG. 3 illustrates an example environment 300 that utilizes a state machine 302 to optimize parameters 304 used by the object-proximity module 216 of FIGS. 2-1 and 2-2. In other words, the object-proximity module 216 may execute the state machine 302 to produce the parameters 304.

The parameters 304 may be the parameters P1 to P21 in Tables 1 to 3 or can be other initial parameters set by the object-proximity module 216 and are yet to be optimized. A parameter sorting and randomization module 306 processes the parameters 304 to output sorted and randomized parameters 308. The randomization may include a change in the value of each of the parameters 304 by a relatively small value or percentage, for example, plus or minus 2%. The sorted and randomized parameters 308 can be used to evaluate a dataset 310. The dataset 310 includes measured or observed ranges over time as the object 110 approaches or departs from the ultrasonic-sensor layout 106. The dataset 310 can be obtained using various methods, apparatuses, and techniques and represent a control group. Then, an entry-detection or exit-detection module 312 evaluates the dataset 310 by using the sorted and randomized parameters 308 and determines whether the object 110 is in an entry-object state 314-1 or an exit-object state 314-2.

Initially, the state machine 302 uses the entry-object state 314-1 or the exit-object state 314 and the initial parameters 304 to perform calculations 316 in the near-object state. The state machine 302 may utilize a machine-learned model. The machine-learned model may be a support vector machine, a recurrent neural network, a convolutional neural network, a deconvolution neural network, a dense neural network, a generative adversarial network, heuristics, or a combination thereof. The machine-learned model may perform parameter and range comparisons. Inputs to the machine-learned model are derived from the dataset 310 and the sorted and randomized parameters 308. Outputs of the machine-learned model are the calculated ranges 316. Given the large computational power that machine learning can use to train a model, the model training can be performed on a cloud, server, or other capable computing device or system. Periodic model updates can be sent to the vehicle 102, allowing the vehicle 102 to execute the machine-learned model even if the vehicle 102 does not have the resources to update the model itself.

As is illustrated in FIG. 3, an error module 318 compares the calculations 316 and dataset of near-object states 310-1 (dataset of objects in the near-object range). Note that the dataset of near-object states 310-1 is a subset of the dataset 310. Recall that the dataset 310 and 310-1 are a control group. Thus, the error module 318 can calculate a mismatch between the dataset of near-object states 310-1 and the calculations 316 and assigns a performance score 320.

The performance score 320 may be a state mismatch, a range mismatch, a parameter performance, a false object detection, a failure to detect an object, or a combination thereof. Then, the parameter sorting and randomization module 306 re-sorts and re-randomizes the parameters 304 based on the performance score 320 to generate new improved parameters 322. The improved parameters 322 are new inputs to the state machine 302. The process of parameter optimization is an iterative process that adjusts the parameters (e.g., P1 to P21) to achieve a lower error, a higher performance score 320, and to increase the accuracy of the object-proximity module 216 of FIGS. 2-1 and 2-2.

Operation Example

Figure 4:
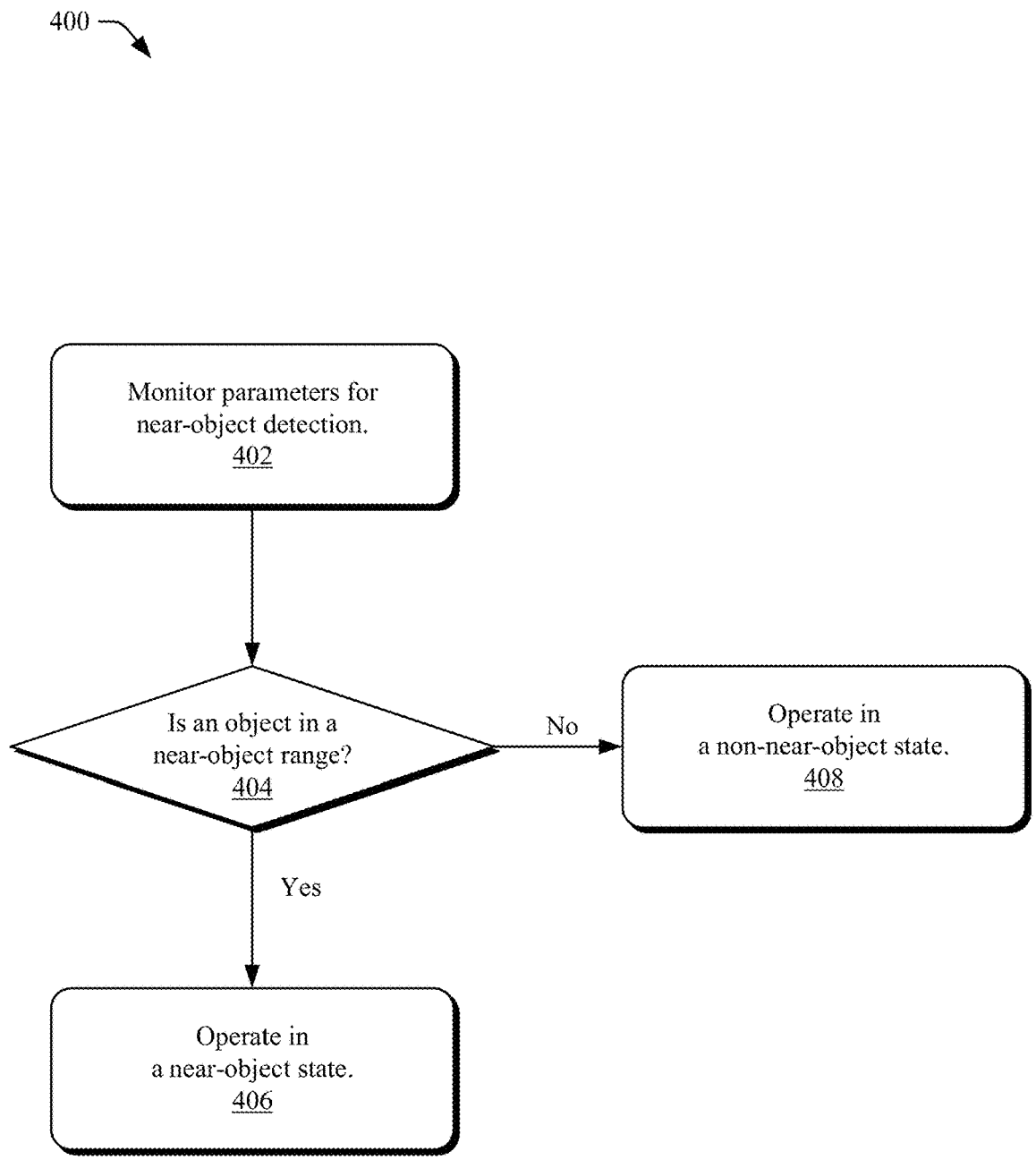
FIG. 4 illustrates an example logic-flow diagram showing operations of an example near-object-detection system operates in the near-object state or the non-near-object state.

FIG. 4 illustrates an example logic-flow diagram 400 used to determine whether the object-detection system 104 operates in the near-object state 216-1 or the non-near-object state 216-2. FIG. 4 is described in the context of FIGS. 1, 2-1, and 2-2, the object-detection system 104, the object-proximity module 216, the object 110, and the vehicle 102. The operations in the logic-flow diagram 400 may be performed by the processors 208 in a different order or with additional or fewer steps than what is shown in FIG. 4.

At stage 402, the object-proximity module 216 monitors parameters (e.g., P1 to P21 in Tables 1 to 3) for near-object detection using at least one ultrasonic sensor. As described in FIG. 2-2, the parameters describe the average of the range of the object 110 from an ultrasonic sensor (e.g., 106-1), a slope of the range, and a variation of the range. The parameters may be derived from the last three, the last four, or more, range measurements and may include more or fewer parameters than what is illustrated in Tables 1 to 3.

At stage 404, using the parameters, the object-proximity module 216 determines whether the range satisfies a threshold range (e.g., 0.15 m), where the threshold range relates to the near-object range or the non-near-object range. If the object-proximity module 216 determines that the object is in the near-object range, at stage 406, the object-detection system 104 operates in the near-object state 216-1. Thus, at stage 406, the object-detection system 104 may place a higher weight on the parameters than the raw range measurements themselves, as described in FIG. 2.2. If the object-proximity module 216 determines that the object is not in the near-object range, at stage 408, the object-detection system 104 operates in the non-near-object state 216-2. Thus, at stage 408, the object-detection system 104 may place a higher weight on raw range measurements and/or may use only the raw range measurements.

Any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

The following are additional examples of techniques for near-object detection using ultrasonic sensors used in vehicle-parking-assist functions.

Example 1: A system configured to: monitor parameters for near-object detection using at least one ultrasonic sensor, the parameters including an average of a range of an object from at least one ultrasonic sensor, a slope of the range, and a variation of the range; determine whether the range satisfies a range threshold; detect the object by operating the at least one ultrasonic sensor in a near-object state in response to determining that the range does satisfy the range threshold; and detect the object by operating the at least one ultrasonic sensor in a non-near-object state in response to determining that the range does not satisfy the range threshold.

Example 2: The system of Example 1, wherein the range threshold depends on: a type of medium between the object and the at least one ultrasonic sensor; and a version of the at least one ultrasonic sensor.

Example 3: The system of Example 2, wherein the type of medium between the object and the at least one ultrasonic sensor comprises air.

Example 4: The system if Example 3, wherein the range threshold comprises a value less than approximately 0.15 meters.

Example 5: The system of Example 4, wherein: each ultrasonic sensor of the at least one ultrasonic sensor includes at least one transducer; the at least one transducer includes at least one transmitter configured to transmit an ultrasonic wave; and the at least one transducer includes at least one receiver configured to receive a reflected ultrasonic wave, and wherein the reflected ultrasonic wave is reflected of an object.

Example 6: The system of Example 5, wherein the at least one ultrasonic sensor is configured to be embedded in or on at least one of: each lateral side of a vehicle, proximate to each corner of the vehicle, across a front of the vehicle, or across a rear of the vehicle.

Example 7: The system of Example 6, wherein the system is further configured to: maintain a count less than a total count of the at least one ultrasonic sensor during operations of vehicle-parking-assist functions; and in response to maintaining the count less than the total-count of the at least one ultrasonic sensor, decrease a time allotted to the at least one ultrasonic sensor for near-object detection.

Example 8: The system of Example 7, wherein each ultrasonic sensor of the at least one ultrasonic sensor operates at a different time during the time allotted to the at least one ultrasonic sensor for near-object detection.

Example 9: The system of Example 7, wherein each ultrasonic sensor of the at least one ultrasonic sensor operates at approximately a same time during the time allotted to the at least one ultrasonic sensor for near-object detection by utilizing modulation of the transmitted ultrasonic wave.

Example 10: The system of Example 9, wherein the system is further configured to utilize modulation of the transmitted ultrasonic wave by modulating at least an amplitude of the transmitted ultrasonic wave.

Example 11: The system of Example 4, wherein the system is configured to monitor the parameters for near-object detection by monitoring, based on driving data, the average, the slope, and the variation of the range of the object from the at least one ultrasonic sensor, the driving data including a driving or a moving direction and speed of the vehicle.

Example 12: The system of Example 11, wherein the system is further configured to derive the average, the slope, and the variation of the range of the object from the at least one ultrasonic sensor from at least last-three measured or observed ranges of the average, the slope, and the variation of the range of the object from the at least one ultrasonic sensor.

Example 13: The system of Example 12, wherein the system is further configured to derive the variation of the range of the object from the at least one ultrasonic sensor by calculating a range difference between a minimum measured or observed range and a maximum measured or observed range of the at least last-three measured or observed ranges and dividing the range difference by a constant.

Example 14: The system of Example 13, wherein the first ultrasonic sensor is configured to communicate the parameters for near-object detection to the second ultrasonic sensor.

Example 15: A computer-implemented method comprising: monitoring parameters for near-object detection using at least one ultrasonic sensor, the parameters including an average of a range of an object from at least one ultrasonic sensor, a slope of the range, and a variation of the range; determining whether the range satisfies a range threshold; and detecting the object by operating the at least one ultrasonic sensor in a near-object state in response to determining that the range does satisfy the range threshold.

Example 16: The computer-implemented method of Example 15, further comprising: detecting the object by operating the at least one ultrasonic sensor in a non-near-object state in response to determining that the range does not satisfy the range threshold.

Example 17: The computer-implemented method of Example 16, wherein each ultrasonic sensor of the at least one ultrasonic sensor operates at a different time during a time allotted to the at least one ultrasonic sensor for near-object detection.

Example 18: The computer-implemented method of Example 16, wherein each ultrasonic sensor of the at least one ultrasonic sensor operates at approximately a same time during a time allotted to the at least one ultrasonic sensor for near-object detection by utilizing modulation of the transmitted ultrasonic wave.

Example 19: The computer-implemented method of Example 16, further comprising deriving the average, the slope, and the variation of the range of the object from the at least one ultrasonic sensor from at least last-three measured or observed ranges of the average, the slope, and the variation of the range of the object from the at least one ultrasonic sensor.

Example 20: The computer-implemented method of Example 19, further comprising deriving the variation of the range of the object from the at least one ultrasonic sensor by calculating a range difference between a minimum measured or observed range and a maximum measured or observed range of the at least last-three measured or observed ranges and dividing the range difference by a constant.

CONCLUSION

Although aspects of near-object detection using ultrasonic sensors embedded in and/or on a vehicle have been described in language specific to features and/or methods, the subject of the appended claims is not necessarily limited to the specific features or methods described. Rather, the specific features and methods are disclosed as example implementations of near-object detection, and other equivalent features and methods are intended to be within the scope of the appended claims. Further, various different aspects are described, and it is to be appreciated that each described aspect can be implemented independently or in connection with one or more other described aspects.

What is claimed:

1. A method comprising:
receiving detected ranges from at least one ultrasonic sensor;
monitoring parameters that are based on the detected ranges, the parameters including: an average of a plurality of the detected ranges, slopes of the plurality of the detected ranges, and variances of the plurality of the detected ranges;
comparing the parameters to a plurality of entry parameters and exit parameters; and
responsive to determining that the parameters satisfy the entry parameters, indicating that an object is within a near-object range; or
responsive to determining that the parameters satisfy the exit parameters, indicating that there is not an object within the near-object range.

2. The method of claim 1, further comprising, responsive to determining that one of the plurality of the detected ranges satisfies a range threshold that corresponds to a non-near-object, indicating that an object is at the one detected range.

3. The method of claim 2, wherein the range threshold is based on at least one of:
- a type of medium that ultrasonic waves from the ultrasonic sensor are traveling through; and
- a version of the at least one ultrasonic sensor.

4. The method of claim 3, wherein the range threshold is based further on the type of medium being air.

5. The method of claim 2, wherein the range threshold comprises a value less than 0.2 meters.

6. The method of claim 1, wherein the at least one ultrasonic sensor comprises a plurality of ultrasonic sensors that are disposed on at least one of: each lateral side of a vehicle, proximate to each corner of the vehicle, across a front of the vehicle, or across a rear of the vehicle.

7. The method of claim 6, further comprising:
- decreasing a time allotted to at least one of the ultrasonic sensors.

8. The method of claim 6, further comprising causing each of the ultrasonic sensors to operate at a different time.

9. The method of claim 6, further comprising causing each of the ultrasonic sensors to operate at approximately a same time.

10. The method of claim 1, further comprising:
- causing the ultrasonic sensor to modulate at least an amplitude of a transmitted ultrasonic wave.

11. The method of claim 1, wherein the method is performed by a system of a vehicle that is stopped.

12. The method of claim 1, wherein the plurality of detected ranges comprises at least three detected ranges.

13. The method of claim 1, wherein the variances of the plurality of the detected ranges are based on a range difference between a minimum and maximum of the plurality of the detected ranges and a constant.

14. A system comprising at least one processor configured to:
- receive detected ranges from at least one ultrasonic sensor;
- monitor parameters that are based on the detected ranges, the parameters including: an average of a plurality of the detected ranges, slopes of the plurality of the detected ranges, and variances of the plurality of the detected ranges;
- compare the parameters to a plurality of entry parameters and exit parameters;
- responsive to a determination that the parameters satisfy the entry parameters, indicate that an object is within a near-object range; and
- responsive to a determination that the parameters satisfy the exit parameters, indicate that there is not an object within the near-object range.

15. The system of claim 14, wherein the parameters comprise at least ten parameters.

16. The system of claim 14, wherein the entry parameters and the exit parameters are stored in a table.

17. The system of claim 14, wherein the processor is further configured to, responsive to a determination that one of the plurality of the detected ranges satisfies a range threshold that corresponds to a non-near-object, indicate that an object is at the one detected range.

18. The system of claim 14, wherein at least one of the plurality of the detected ranges is less than 0.2 meters.

19. The system of claim 14, wherein the near-object range is within 0.2 meters.

20. Computer-readable storage media comprising instructions that, when executed, cause at least one processor to:
- receive detected ranges from at least one ultrasonic sensor;
- monitor parameters that are based on the detected ranges, the parameters including: an average of a plurality of the detected ranges, slopes of the plurality of the detected ranges, and variances of the plurality of the detected ranges;
- compare the parameters to a plurality of entry parameters and exit parameters;
- responsive to a determination that the parameters satisfy the entry parameters, indicate that an object is within a near-object range;
- responsive to a determination that the parameters satisfy the exit parameters, indicate that there is not an object within the near-object range; and
- responsive to a determination that one of the plurality of the detected ranges satisfies a range threshold that corresponds to a non-near-object, indicate that an object is at the one detected range.

* * * * *